United States Patent
Swan et al.

[19]

[11] Patent Number: 5,925,092
[45] Date of Patent: Jul. 20, 1999

[54] SATELLITE CLUSTER WITH SYNCHRONIZED PAYLOAD PROCESSORS AND METHOD FOR USE IN SPACE-BASED SYSTEMS

[75] Inventors: Peter Alfred Swan, Paradise Valley; William Joe Haber, Tempe; Keith Andrew Olds, Mesa, all of Ariz.

[73] Assignee: Motorola, Inc., Schaumburg, Ill.

[21] Appl. No.: 08/759,243

[22] Filed: Dec. 2, 1996

[51] Int. Cl.[6] .................................................. G06F 165/00
[52] U.S. Cl. .......................... 701/226; 701/33; 701/213; 364/131; 395/182.1; 455/12.1
[58] Field of Search ............................ 701/33, 213, 226; 455/3.2, 5.1, 12.1, 13.2; 342/357, 352; 364/131, 132, 133; 395/182.09, 182.1, 553

[56] References Cited

U.S. PATENT DOCUMENTS

| | | | |
|---|---|---|---|
| 4,004,098 | 1/1977 | Shimasaki | 179/15 |
| 4,375,697 | 3/1983 | Visher | 455/13 |
| 4,494,211 | 1/1985 | Schwartz | 701/226 |
| 4,502,051 | 2/1985 | Dondl | 343/356 |
| 4,720,873 | 1/1988 | Goodman et al. | 455/12.1 |
| 4,943,808 | 7/1990 | Dulck | 342/356 |
| 5,326,054 | 7/1994 | Turner | 244/158 |
| 5,502,446 | 3/1996 | Denninger | 455/12.1 |
| 5,506,780 | 4/1996 | Montenbruck et al. | 364/459 |

*Primary Examiner*—William A. Cuchlinski, Jr.
*Assistant Examiner*—Gertrude Arthur
*Attorney, Agent, or Firm*—Sherry J. Whitney; Frank J. Bogacz

[57] ABSTRACT

A communication satellite system (100) includes one or more satellite clusters (150). Each satellite cluster (150) includes synchronized payload processors which are interconnected and synchronized into a parallel processing system using at least one crosslink (208) between multiple processor payload satellites (204). One element in the synchronized payload processors acts as a primary processor and other processor elements act as secondary processors. The primary processor controls and synchronizes the secondary processors. Various services which can include communication services, imaging services, and navigational services are provided to communication units (130) using at least one processor payload satellite (204) in satellite cluster (150). Two or more satellite clusters (150) are connected via a crosslink (138) which provides a communication and synchronization path between the satellite clusters (150).

21 Claims, 6 Drawing Sheets

SATELLITE CLUSTER WITH SYNCHRONIZED PAYLOAD PROCESSORS AND METHOD FOR USE IN SPACE-BASED SYSTEMS

CROSS REFERENCE TO RELATED INVENTION

The present invention is related to U. S. Ser. No. 08/657, 846, entitled "Geosynchronous Satellite Communication System and Method", filed May 31, 1996, which is assigned to the same assignee as the present invention.

FIELD OF THE INVENTION

The present invention pertains to space-based systems and, more particularly, to processing information and data in space-based systems.

BACKGROUND OF THE INVENTION

International regulations govern the placement and station keeping for geosynchronous satellites. These regulations require the ground path of a geosynchronous satellite to intersect the equator only within a tolerance window, or "orbital slot", which is allocated to the satellite. Typically, each orbital slot is centered over a single longitude and is defined about the central position by ±0.05 degrees to ±0.1 degrees of longitude. Orbital slots currently are centered at every two degrees of longitude (i.e., 180 slots exist around the earth). This separation helps to ensure that signals emitted from satellites located in adjacent orbital slots will not significantly interfere with each other.

The finite availability of orbital slots encourages satellite designers to design geosynchronous satellites having the largest possible processing and/or data-carrying capacity. The capacity of a geosynchronous satellite is typically proportional to the size of the satellite and is limited by the state of current technology. Large, prior art geosynchronous satellites are expensive to build and place in orbit. Because of the expense, it is not typically feasible to frequently replace geosynchronous satellites which have too little capacity due to inadequate size and/or outdated technology.

Another major problem in space systems is that launch costs dominate the cost equation, and the launch "throw weight" limits the on-orbit capacity of single satellites. To continue to enhance the on-orbit capability of satellites, the prior-art approach has been to increase the size of the satellites and launch vehicles. The future growth in this direction seems to have topped out for financial reasons as well as the lack of a need for large satellites for government programs. In addition, there is a movement towards smaller satellites across the industry.

In some prior art systems, multiple geostationary satellites are placed within a single orbital slot in order to increase the data carrying capacity of the system within that slot. This is referred to as co-positioning or co-location. For example, multiple geostationary Astra satellites are operated within an orbital slot centered at 19.2 degrees east. U.S. Pat. No. 5,506,780 also discloses a geostationary satellite system which includes multiple, co-located satellites.

Some prior art systems have used parallel processing techniques to increase the processing power of the system. Parallel processing refers to the concurrent or simultaneous execution of two or more processes. Parallel processing may be contrasted with serial processing, which refers to consecutive or sequential execution of two or more processes. Generally speaking, a single computing processor may engage in only serial processing, but a collection of processors or computers may be arranged in a parallel processing architecture to engage in parallel processing.

Conventional parallel processing architectures and related techniques have been devised to solve immensely complex computational problems in real time. Also, prior art systems have been devised to achieve a greater computational throughput than can be achieved with a serial processing architecture. Unfortunately, existing space-based parallel processing architectures do not accommodate alteration of existing capabilities and do not allow the addition of new capabilities.

What are needed are a method and apparatus which enable the processing and/or data carrying capacity within a particular orbital slot to be increased relative to demand and in conjunction with state-of-the-art technology.

What are also needed are a method and apparatus to eliminate the need to enhance on-orbit capabilities of satellites without increasing the size of the satellites. In addition, a need exists for a method and apparatus to provide more processing power using smaller satellites.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

Figure 1:
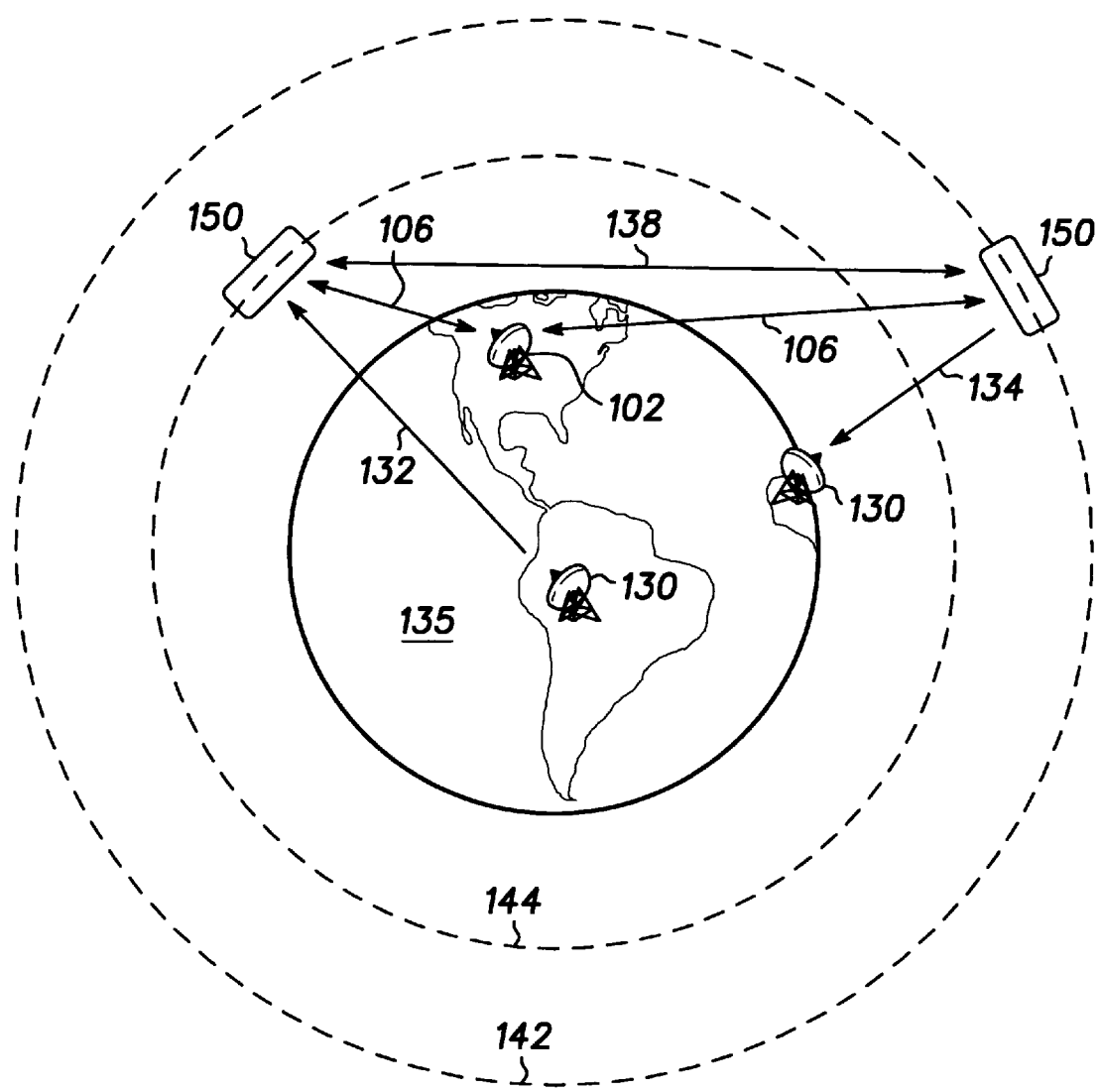
FIG. 1 shows a block diagram of a satellite communication system in which the space-based processing and communication facilities are provided by satellite clusters with synchronized payload processors in accordance with a preferred embodiment of the present invention.

The method and apparatus of the present invention enable the data processing capacity within a space-based system to be increased relative to demand and in conjunction with state-of-the-art technology. The method and apparatus of the present invention also allow satellite systems to be implemented using multiple satellite payloads which can be managed more cost effectively.

The method and apparatus of the present invention increase on-orbit capability through the use of "system processors", not individual satellites. By bringing together satellites into operational clusters with interconnected and synchronized payload processors, large multi-processing computer systems can be placed in orbit. As used herein, a "cluster" of processor payload satellites is defined as the grouping of processor payload satellites within communication range of each other with synchronized payload processors to achieve single missions, such as telecommunications. The integration of multiple satellites through an interconnected payload processor greatly increases the processing power on-orbit. Using the method and apparatus of the present invention, the system's mission can be maximized in a cost effective manner.

The concept is that the processor power increases toward a supercomputer capability by clustering the individual processor payload satellites together in a synchronous manner. The amount of processing capability is paced to meet the demands of the mission along with other capabilities that also increase as more processor payload satellites are deployed. For example, the channel capacity of a communication system which uses the method and apparatus of the present invention increases as more processor payload satellites are added to the system. The power of the multiprocessor control system increases in conjunction with the system capacity to match the increasing processing demands associated with the increased capacity. Similar modular growth could be achieved also in other processing-intensive space system missions such as earth resource monitoring, navigation, imaging, space science, astronomy, defense oriented missions, and intelligence operations.

The method and apparatus of the present invention allow computational power to be brought on line as the demand for calculations requires. This approach improves costs because resources are properly managed. Resources are provided based on need which means it is not necessary to provide sufficient resources to meet the maximum demand for those resources until that maximum demand actually exists. Also, the method and apparatus of the present invention allow the computational power to be dynamically reconfigurable without significantly affecting the computational power currently available. This approach allows algorithms for calculating tasks to be modified from time to time and new computational tasks to be added from time to time without significantly altering the existing computational throughput.

The present invention provides a satellite cluster with synchronized payload processors which provides a systems solution to providing extremely high computer processing capacity on-orbit. In a preferred embodiment of the present invention, a satellite cluster comprising a plurality of geosynchronous processor payload satellites is positioned in orbit. In this embodiment, the processor payload satellites in the satellite cluster are positioned in substantially a straight line with respect to a point of the surface of the earth. This is possible because only one processor payload satellite needs to establish a communication channel with transmitting and receiving sources on the earth. Other processor payload satellites in the satellite cluster can be shadowed from the earth by adjacent processor payload satellites without any ill effects. In addition, the location of processor payload satellites can be changed to allow failed or failing processor payload satellites to be replaced by fully functional processor payload satellites. This allows a processor payload satellite in a shadowed location to be moved to a non-shadowed location.

Alternate embodiments of the present invention are applicable to satellites in all orbital types, which include, but are not limited to Low Earth Orbit (LEO), Medium Earth Orbit (MEO), Geosynchronous Earth Orbit (GEO), and Highly Elliptical Orbit (HEO) satellites. Satellite systems can be established using different numbers of processor payload satellites in different orbits and in a common orbital slot. For example, a processor payload satellite could be put into a geosynchronous orbit to control and communicate with additional processor payload satellites in one or more non-geosynchronous orbits. In addition, a processor payload satellite could be put into a non-geosynchronous orbit to control and communicate with additional processor payload satellites in one or more non-geosynchronous orbits.

In a preferred embodiment, all of the processor payload satellites in the cluster contain payload processors which comprise at least one processor element, and all of the processor payload satellites are interconnected with each other through crosslinks. Furthermore, all of the payload processors are interconnected and synchronized into a parallel processing system using the crosslinks between the multiple geosynchronous processor payload satellites. The synchronized payload processors are a parallel processing system which can extend over multiple satellites.

Synchronization is accomplished by establishing one processor as a primary processor in the synchronized payload processors and by making the other processor elements perform as secondary processors in the synchronized payload processors. In this way, the primary processor controls and synchronizes the secondary processors. In addition, at least one processor payload satellite of the plurality of processor payload satellites communicates with at least one ground device over a downlink between one of the processor payload satellites and the ground device. For example, a ground device could be a communication unit, a system control center, or other similar device.

FIG. 1 shows a block diagram of a satellite communication system in which the space-based processing and communication facilities are provided by satellite clusters with synchronized payload processors in accordance with a preferred embodiment of the present invention. Satellite communication system 100 comprises system control center 102 located proximate to the surface of the earth 135, satellite clusters 150, and communication units 130. The method and apparatus of the present invention do not require system control center 102 to be located on the surface of the earth 135.

One satellite cluster 150 is shown in orbit 142, and a second satellite cluster 150 is shown in orbit 144. The present invention does not require orbits 142 and 144 to be different, but they can be different. Satellite clusters 150 communicate with each other over link 138. Communication units 130 are shown located proximate to the surface of the earth 135. The present invention does not require communication units 130 to be on the surface of the earth 135. Communication units 130 can be located anywhere a communication channel can be provided between communication unit 130 and satellite cluster 150. In a preferred embodiment, satellite communication system 100 uses satellite clusters 150 with synchronized payload processors to provide communication services to a plurality of communication units 130.

At least one uplink communication channel is provided via uplink 132 from communication units 130 to satellite cluster 150. Communication units 130 use uplink 132 to transmit uplink and command signals to satellite cluster 150. At least one downlink communication channel is provided via downlink 134 from satellite cluster 150 to communication units 130. Communication units 130 use downlink 134 to receive downlink signals and response signals from satellite cluster 150. In FIG. 1, only two communication units 130, only one uplink 132, and only one downlink 134 are shown to simplify the explanation of the preferred embodiment shown. Those skilled in the art will recognize that many communication units 130, many uplinks 132, and many downlinks 134 are possible. It should also be recognized that uplink 132 and downlink 134 could be bi-directional links.

Those skilled in the art will also recognize that a communication unit in a communication system may, from time to time, perform functions of both a transmitter and a receiver or change from a transmitter to a receiver and vice versa. These changes are usually controlled by a processor. Communication unit 130 can be, for example, a hand-held, portable cellular telephone adapted to transmit data to and/or receive data from satellite cluster 150. Communication unit 130 can also be a facsimile device, pager, data terminal, an imaging system terminal, or any other type of communication device adapted to transmit data to and/or receive data from satellite cluster 150.

Satellite cluster 150 communicates with system control center 102 via link 106. Link 106 provides a bi-direction communication channel for data signals to be sent between system control center 102 and satellite cluster 150. System control center 102 transmits uplink signals and command signals to satellite cluster 150 and receives downlink signals and response signals from satellite cluster 150. In FIG. 1, two satellite clusters 150, one system control center 102, and two links 106 are shown to simplify the explanation of the preferred embodiment shown. Those skilled in the art will recognize that any number of satellite clusters 150, system control centers 102, and links 106 are possible. In alternate embodiments, any number of system control centers could be used having multiple synchronized processors located proximate to the surface of the earth and interconnected using various means (e.g., fiber optic cables, RF links).

Figure 2:
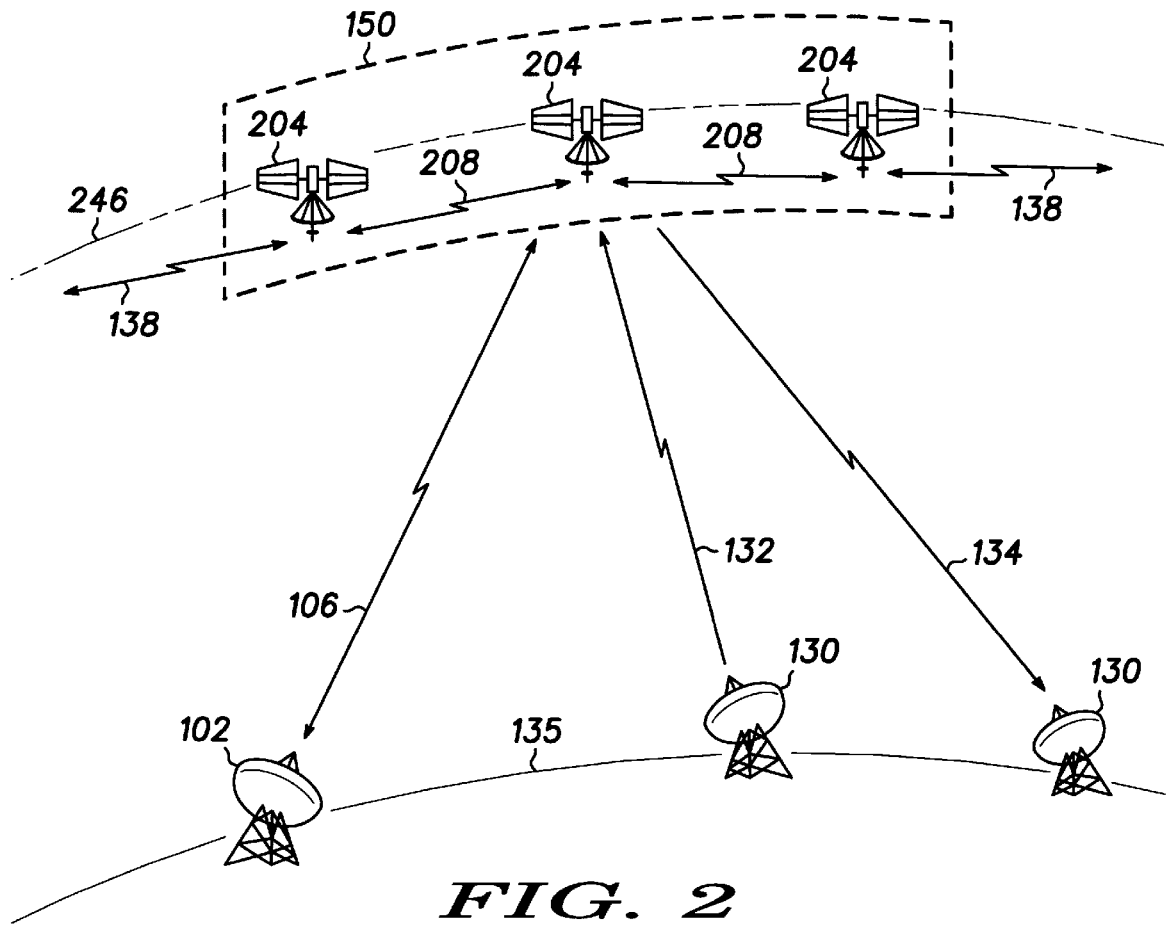
FIG. 2 shows a block diagram of a satellite cluster with synchronized payload processors located in orbit around the earth in accordance with a preferred embodiment of the present invention.

FIG. 2 shows a block diagram of satellite cluster 150 (FIG. 1) with synchronized payload processors located in orbit 246 around the earth 135 (FIG. 1) in accordance with a preferred embodiment of the present invention. Three processor payload satellites 204 are shown linked together to form satellite cluster 150 which are shown located in orbit 246. In addition, downlink 134, uplink 132, link 106, system control center 102, and communications units 130 which are proximate to the surface of the earth 135 are shown in conjunction with FIG. 2.

Processor payload satellites 204 communicate with other processor payload satellites 204 via crosslinks 208. Crosslinks 208 are used to interconnect the processor elements located on processor payload satellites 204 into a parallel processing system. Crosslinks 208 provide communication paths for data and timing signals between processor payload satellites 204 of satellite cluster 150. The data exchanged on crosslinks 208 are used to control and coordinate the synchronized payload processors in satellite cluster 150.

Also shown are additional crosslink communication channels provided via crosslinks 138 from one satellite cluster 150 to other satellite clusters 150. These different satellite clusters can either be or not be in the same orbit. Alternate embodiments of the present invention can be obtained by changing the number of processor payload satellites in a satellite cluster 150, the number of satellite clusters and/or their positions relative to each other and relative to the earth.

Figure 3:
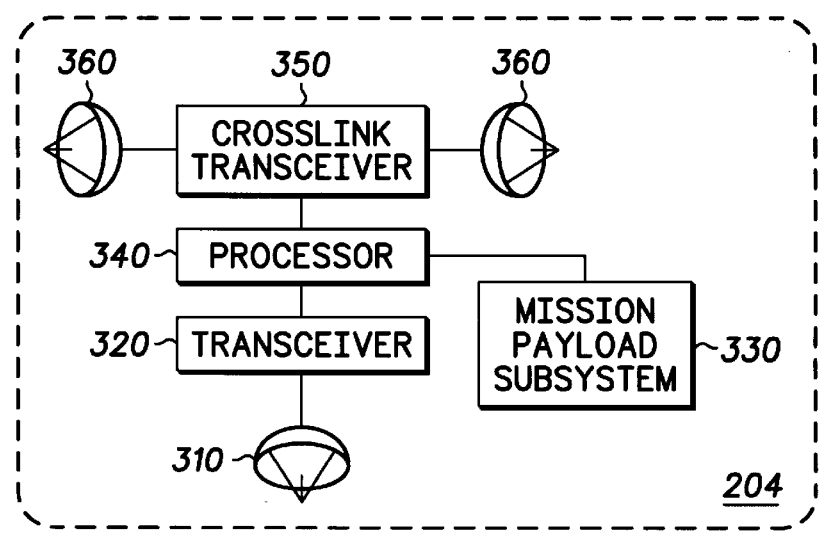
FIG. 3 shows a block diagram for a processor payload satellite in a satellite cluster in accordance with a preferred embodiment of the present invention.

FIG. 3 shows a block diagram for processor payload satellite 204 in a satellite cluster in accordance with a preferred embodiment of the present invention. Processor payload satellite 204 includes antenna unit 310, transceiver 320, payload processor 340, mission payload subsystem 330, crosslink transceiver 350, and crosslink antenna units 360.

Antenna unit 310 can be a radio frequency (RF) communication device or a laser communication device. For example, antenna unit 310 is used to communicate with transmitting and receiving sources which can be located on the earth or can be located above the surface of the earth. In a preferred embodiment, antenna unit 310 is used to transmit and receive signals to and from communications units 130 (FIG. 1) and to and from system control center 102 (FIG. 1). It will be understood that while each processor payload satellite 204 is illustrated in FIG. 3 as having a single antenna unit 310, each antenna unit 310 will typically comprise several antennas (e.g., a phased array antenna). These antennas can be of different types so that processor payload satellite 204 can communicate with more than one communication unit 130 (FIG. 1) at a time and with system control center 102 (FIG. 1). Those skilled in the art will appreciate that instead of a bank of discrete, uni-directional antennas, antenna unit 310 can be implemented as a single, phased-array antenna or a combination of uni-directional antennas and phased-array antennas.

Antenna unit 310 is used to receive uplink signals transmitted from transmitting sources to processor payload satellite 204 (FIG. 2). Transmitting sources use uplink signals to cause at least one computational task to be performed on processor payload satellite 204. Antenna unit 310 is also used to transmit downlink signals from processor payload satellite 204 to receiving sources. Processor payload satellite 204 uses the downlink signals to provide information resulting from the performance of computational tasks to receiving sources.

Antenna unit 310 is coupled to transceiver 320 which is used to convert and demodulate the uplink signals received from antenna unit 310 into uplink data which can be sent to payload processor 340. Transceiver 320 also is used to modulate downlink data received from payload processor 340 into downlink signals which can be transmitted by antenna unit 310.

Payload processor 340 desirably includes several "processor elements" that can be controlled individually and which can be used as a primary processor or as a secondary processor in a parallel processing system. As used herein, a "processor element" is any processor on-board any processor payload satellite which can be individually controlled as a single-element processing system, or controlled as a part of a multi-element processing system. Processor elements can be used (e.g., turned on or off as needed, depending on the required computational activity. The ability to control individual elements of payload processor 340 enables conservation of power on each satellite and management of power resources between satellites in a cluster. For example, power consumption is particularly important for LEO constellations in which satellites spend considerable time in the shadow of the earth where their solar cells cannot replenish battery power.

Processor elements in payload processor 340 are used in single-element and multi-element processing systems to process mission critical data, process uplink data, process downlink data, process crosslink transmitted data, and process crosslink received data, to perform computational tasks and to control operations on a payload processor satellite.

In a preferred embodiment of the present invention, synchronized payload processors comprise a primary processor and one or more secondary processors. Desirably, a secondary processor can become a primary processor if a failure occurs in the primary processor. In the early stages of system deployment, a single processor payload satellite can operate until additional processor payload satellites are put into service. The synchronized payload processors can also function at a reduced capacity using as few as one processor element. The multi-element processing system can also function at a reduced capacity using as few as two processor elements. Reduced capacity may be all that is needed in the early stages of system deployment.

In a preferred embodiment, payload processor 340 not only maintains the processor payload satellite's health and controls the operation of processor payload satellite 204 (FIG. 2) in response to commands from system control center 102 (FIG. 1), but also conducts some of the necessary mission analysis for the system.

Mission payload subsystem 330 contains the elements of the spacecraft that are dedicated to a specific mission. Mission payload subsystem 330 provides and uses mission critical data. Exemplary missions performed by mission payload subsystem 330 are optical monitoring of the earth or communications.

Crosslink transceiver 350 is coupled to crosslink antenna units 360 and contains elements to control the operation of crosslink antenna units 360. Crosslink transceiver 350 also provides timing circuits for maintaining synchronization across the crosslink (e.g., crosslinks 208 (FIG. 2) and 138 (FIG. 1)). Crosslink transceiver 350 also contains buffering circuitry to allow efficient crosslink data transfers.

Crosslink transceiver 350 converts crosslink transmitted data into crosslink transmitted signals and converts crosslink received signals into crosslink received data. The crosslink transmitted data is data which is sent to another satellite in satellite cluster 150 (FIG. 1) and is used to cause at least one processor element in another satellite to perform any number of computational tasks. The crosslink received data is data which is received from another satellite. Crosslink received data is data which results from any number of computational tasks being performed on another satellite.

Crosslink antenna units 360 are coupled to crosslink transceiver 350 and provide the transmission means to transmit crosslink signals to and receive crosslinks signals from other processor payload satellites. It will be understood that while processor payload satellite 204 as illustrated has two crosslink antenna units 360, any number may be used. Also, it will be understood that each crosslink antenna unit 360 can comprise several antenna elements, so that processor payload satellite 204 can communicate with more than one other processor payload at a time. Those skilled in the art will appreciate that instead of a bank of discrete, uni-directional antennas, crosslink antenna units 360 can be implemented as a single multi-beam, phased-array antenna or a combination of uni-directional and phased-array antennas.

Figure 4:
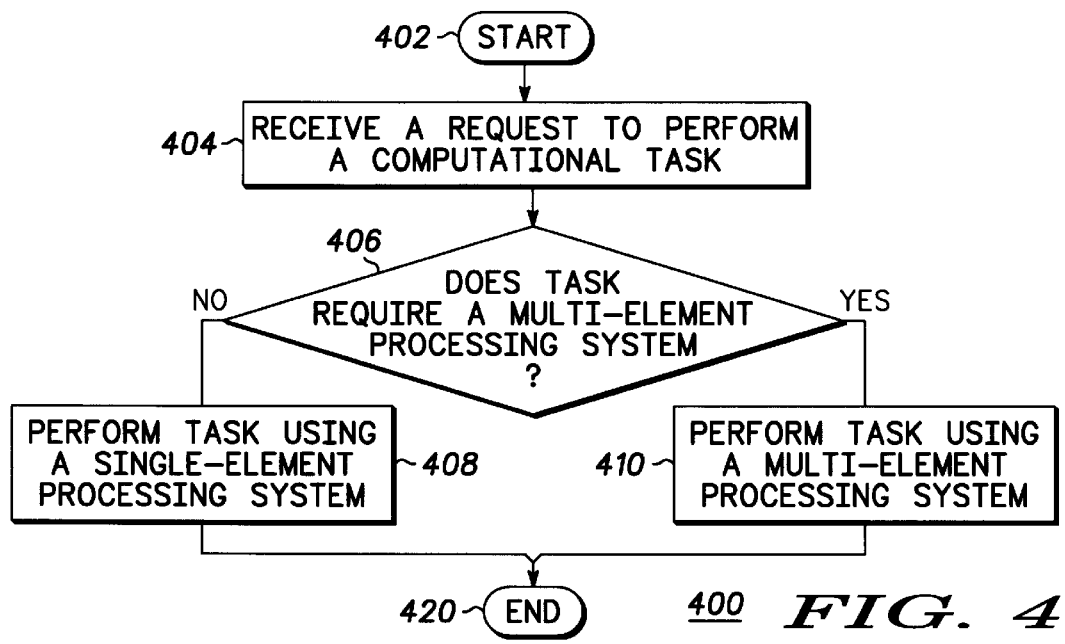
FIG. 4 shows a flow diagram for a procedure for determining how computational tasks are to be performed by a satellite cluster with synchronized payload processors in accordance with a preferred embodiment of the present invention.

FIG. 4 shows a flow diagram for a procedure for determining how computational tasks are to be performed by a satellite cluster with synchronized payload processors in accordance with a preferred embodiment of the present invention. Procedure 400 is performed by a primary processor on-board a satellite. Initiating procedure 400 could be the result of a command from the system control center or an on-board process. Procedure 400 starts with step 402. In step 404, a request is received by a satellite to perform a computational task. For example, computational tasks could include image processing, position determination, and call processing.

In step 406, a query is performed to determine if the computational task is a task which requires a multi-element processing system. Computational tasks are separated into two different categories based on the complexity of the task. The two categories are tasks which can be performed by a single-element processing system and tasks which must be performed by a multi-element processing system. When the computational task can be performed by a single-element processing system, the computational task is performed in step 408 using a single-element processing system. Single-element processing is described in more detail in conjunction with FIG. 5. When the computational task requires a multi-element processing system, the computational task is performed in step 410 using a multi-element processing system. Multi-element processing is described in more detail in conjunction with FIG. 6. Procedure 400 ends with step 420.

Figure 5:
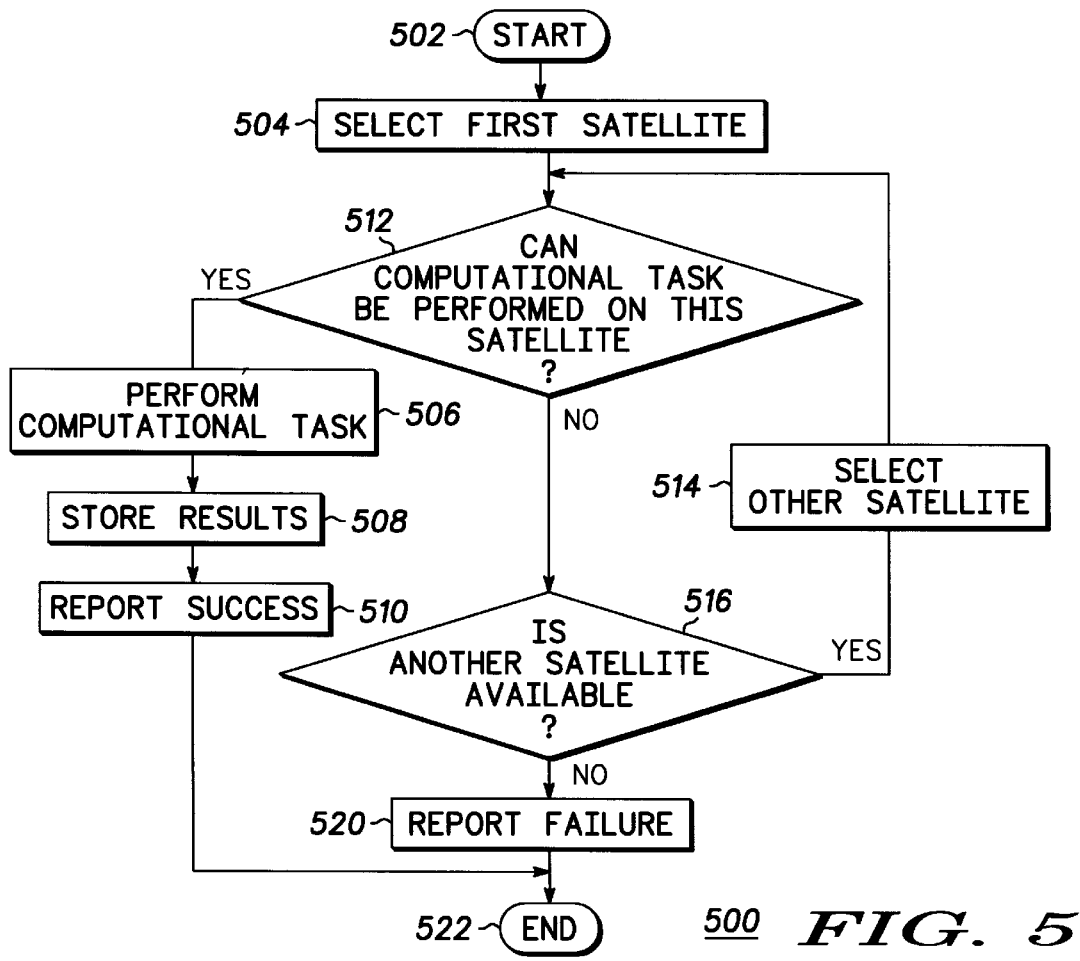
FIG. 5 shows a flow diagram for performing a computational task using a single-element processing system within a satellite cluster with synchronized payload processors in accordance with a preferred embodiment of the present invention.

FIG. 5 shows a flow diagram for performing a computational task using a single-element processing system within a satellite cluster with synchronized payload processors in accordance with a preferred embodiment of the present invention. Basically, procedure 500 determines which single-element processor is to be used to perform the computational task.

Procedure 500 starts with step 502. In step 504, a first processor payload satellite is selected. This can be the same processor payload satellite that contains the primary processor, for example. In step 512, a query is performed to determine if the computational task can be performed on the selected processor payload satellite. In determining if the computational task can be performed on the selected processor payload satellite, various operations are performed, including determining if processor elements are busy, overheated, prone to failure, or in a redundant state. In addition, the processor payload satellite's temperature, power availability, and power consumption are examined.

If the task can be performed on the first selected processor payload satellite, then procedure 500 branches to step 506, in which the computational task is performed. In step 508, the results obtained in step 506 are stored. Then, in step 510, a message is sent to the primary processor to report a successful completion of the single-element task. After step 510, procedure 500 ends with step 522.

Referring back to step 512, if the computational task cannot be performed on the selected processor payload satellite, then procedure 500 branches to step 516. In step 516, another query is performed which determines if another processor payload satellite is available to perform the computational task. If not, then procedure 500 branches to step 520 where a message is sent to the primary processor to report the failure of this single-element task. In determining if another processor payload satellite is available, various operations are performed such as determining if other processor payload satellites are available in this cluster, determining if other satellite clusters are available, and/or determining if crosslinks are functioning. After step 520, procedure 500 ends in step 522. If step 516 determines that another processor payload satellite is available to perform the computational task, then procedure 500 branches to step 514. In step 514, the other available processor payload satellite is selected, and procedure 500 continues with step 512. The procedure then iterates as shown in FIG. 5.

Figure 6:
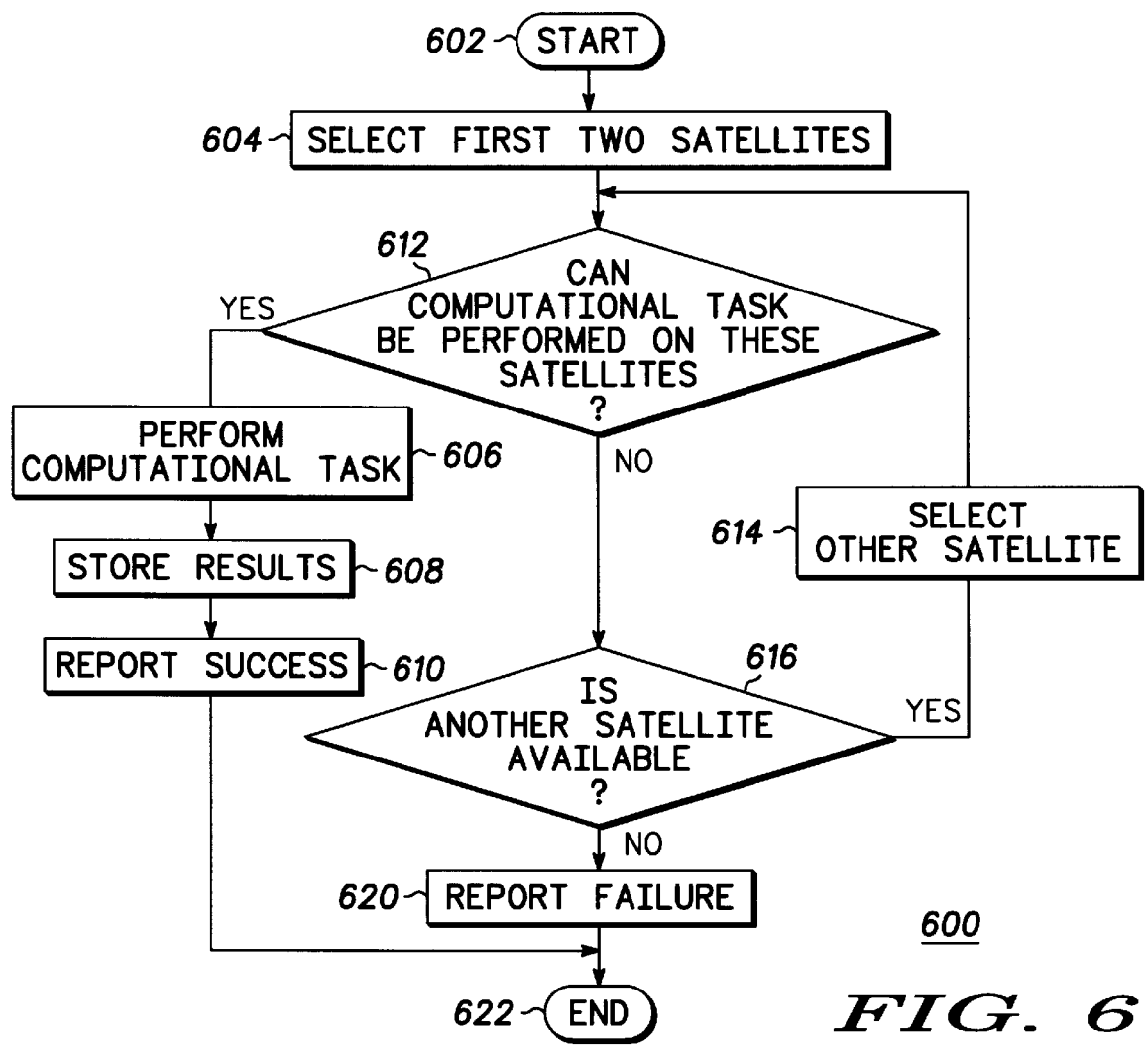
FIG. 6 shows a flow diagram for performing a computational task using a multi-element processing system within a satellite cluster with synchronized payload processors in accordance with a preferred embodiment of the present invention.

FIG. 6 shows a flow diagram for performing a computational task using a multi-element processing system within a satellite cluster with synchronized payload processors in accordance with a preferred embodiment of the present invention. Basically, procedure 600 determines which multi-element processing system is to be used to perform the computational task.

Procedure 600 starts with step 602. In step 604, two processor payload satellites are selected. In determining which two processor payload satellites to use, various operations are performed such as determining if other processor payload satellites are available in this cluster, determining if other satellite clusters are available, and/or determining if crosslinks are functioning.

In step 612, a query is performed to determine if the multi-element computational task can be performed on the selected processor payload satellites. In determining if the computational task can be performed on the selected processor payload satellites, various operations are performed, including determining if the required number of processor elements are busy, overheated, prone to failure, or in a redundant state. In addition, the processor payload satellite's temperature, power availability, and power consumption are examined.

If the task can be performed on the selected processor payload satellites, then procedure 600 branches to step 606 in which the computational task is performed. The computational task is performed by sending instructions to the selected processing elements (e.g., via crosslinks 138, 208 (FIG. 2)). These instructions describe the portion of the computational task the element is to perform. Results from each element are then collected. In step 608, the results obtained in step 606 are stored. In step 610, a message is sent to the primary processor to report a successful completion of the computational task. After step 610, procedure 600 ends in step 622.

Referring back to step 612, if the task cannot be performed on the selected processor payload satellites, then procedure 600 branches to step 616. In step 616, another query is performed to determine if one or more other processor payload satellites are available to be used in establishing a multi-element processing system to perform the computational task. If not, then procedure 600 branches to step 620 where a message is sent to the primary processor to report the failure of the computational task. After step 620, procedure 600 ends in step 622. If step 616 determines that more other processor payload satellites are available, then procedure 600 branches to step 614. In step 614, the available processor payload satellites are selected, and procedure 600 continues with step 612. The procedure then iterates as shown in FIG. 6.

Figure 7:
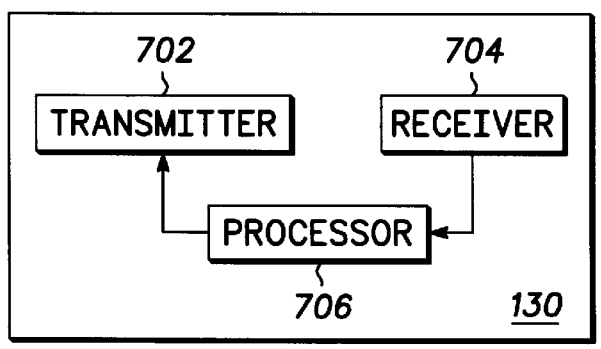
FIG. 7 shows a block diagram for a communication unit in accordance with a preferred embodiment of the present invention.

FIG. 7 shows a block diagram for a communication unit in accordance with a preferred embodiment of the present invention. Communication unit 130 comprises transmitter 702, receiver 704 and processor 706. Transmitter 702 provides at least one uplink communication channel to a satellite cluster with synchronized payload processors. Transmitter 702 transmits command signals to a satellite cluster, causing the synchronized payload processors to perform computational tasks. Receiver 704 provides at least one downlink communication channel from at least one satellite cluster with synchronized payload processors. Receiver 704 receives response signals from the satellite cluster, and these response signals contain data resulting from computational tasks performed by the synchronized payload processors. Processor 706 is coupled to transmitter 702 and receiver 704, and is used for determining the command signals, for processing response signals, and for controlling transmitter 702, receiver 704, and communication unit 130.

Figure 8:
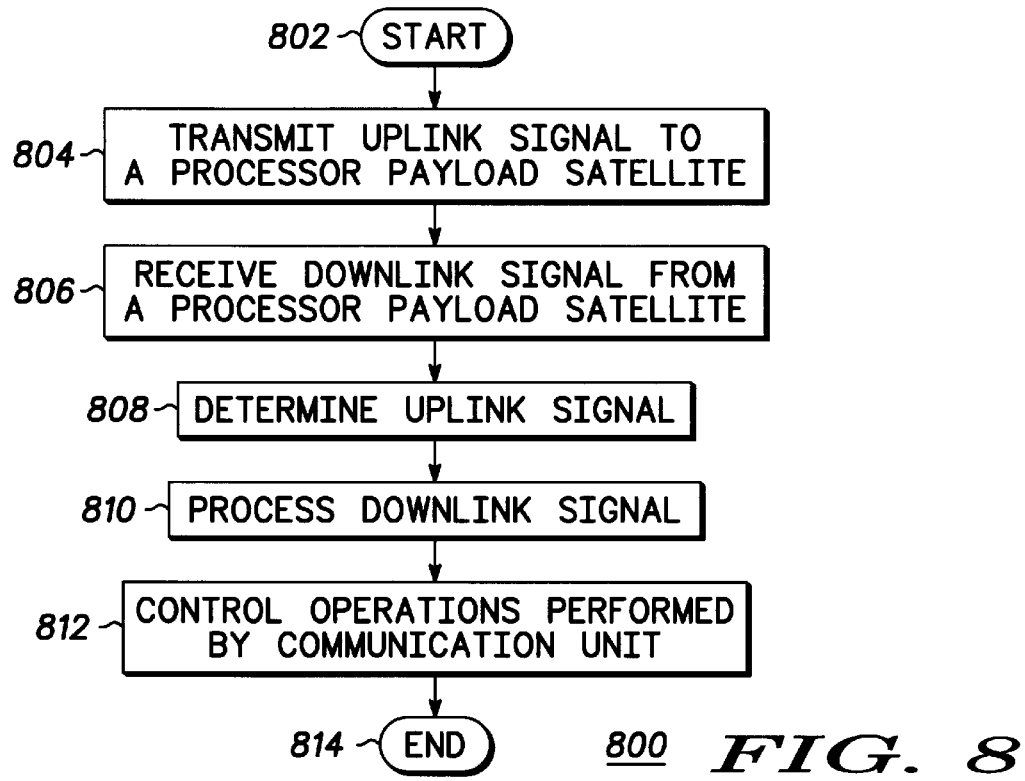
FIG. 8 shows a flow chart for a method of operating a communication unit in accordance with a preferred embodiment of the present invention.

FIG. 8 shows a flow chart for a method of operating a communication unit in accordance with a preferred embodiment of the present invention. Procedure 800 starts with step 802. In step 804, an uplink signal is transmitted to a processor payload satellite in satellite cluster 150 (FIG. 1). The uplink signal contains at least one command signal which causes the synchronized payload processors in the satellite cluster to perform at least one computational task. For example, the uplink signal could be from an image processing device, in which case a command could be transmitted to cause the satellite cluster to send back a particular image.

In step 806, a downlink signal is received from at least one processor payload satellite in the satellite cluster. The downlink signal contains data signals from the satellite cluster which results from computational tasks being performed by the synchronized payload processors. For example, a downlink signal could contain imaging data for a particular image.

In step 808, an uplink signal is determined. For example, a processor needs to determine which image needs to be processed by the satellite cluster. In step 810, a downlink signal is processed. For example, this could involve processing image data contained in a downlink signal. Finally in step 812, processing is done to control operations performed by communication unit 130 (FIG. 7). For example, this could involve controlling how an image is reconstructed from the data contained in downlink signals. Procedure 800 ends in step 814.

Figure 9:
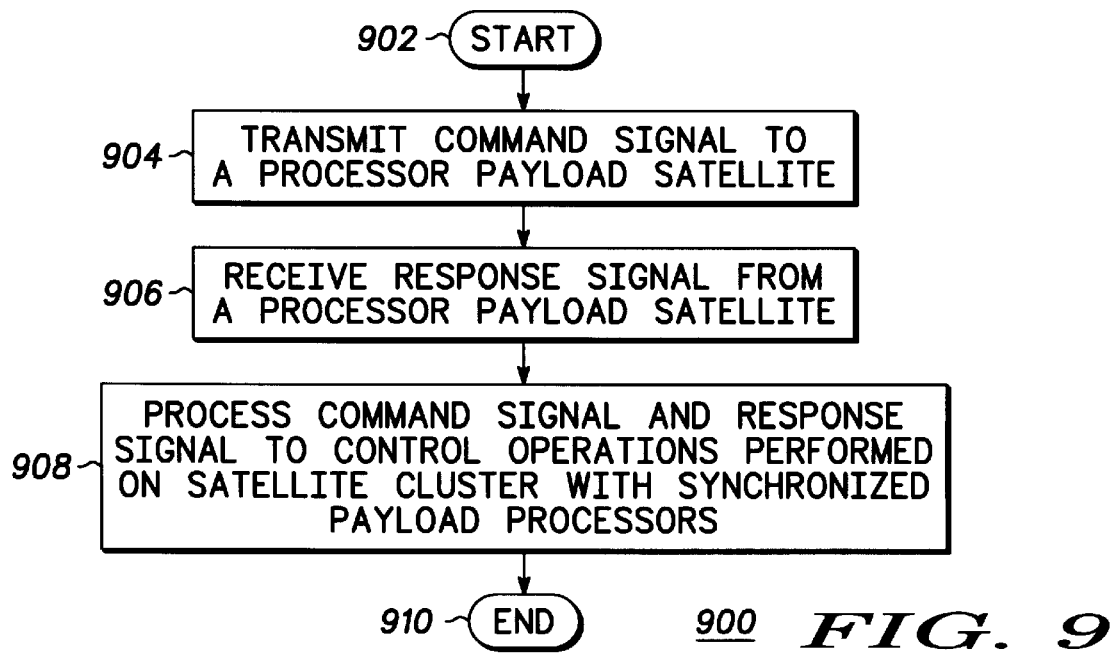
FIG. 9 shows a flow chart for a method of operating a system control center in accordance with a preferred embodiment of the present invention.

FIG. 9 shows a flow chart for a method of operating a system control center in accordance with a preferred embodiment of the present invention. Procedure 900 starts with step 902. In step 904, the system control center transmits a command signal to a processor payload satellite in a satellite cluster with synchronized payload processors. The command signal causes the synchronized payload processors in the satellite cluster to perform a computational task. In step 906, the system control center receives a response signal from a processor payload satellite in the satellite cluster with synchronized payload processors. The response signal contains data from the satellite cluster which results from the computational task being performed by the synchronized payload processors. In step 908, the system control center processes command signals and response signals. The system control center uses these signals to control operations being performed by the satellite clusters with synchronized payload processors. The command signals are used to cause an operation to be performed by the synchronized payload processors on the satellite clusters. The response signals are used to determine results of operations performed by the synchronized payload processors on the satellite clusters. The system control center also uses these signals to obtain mission data from response signals. Procedure 900 ends in step 910.

Figure 10:
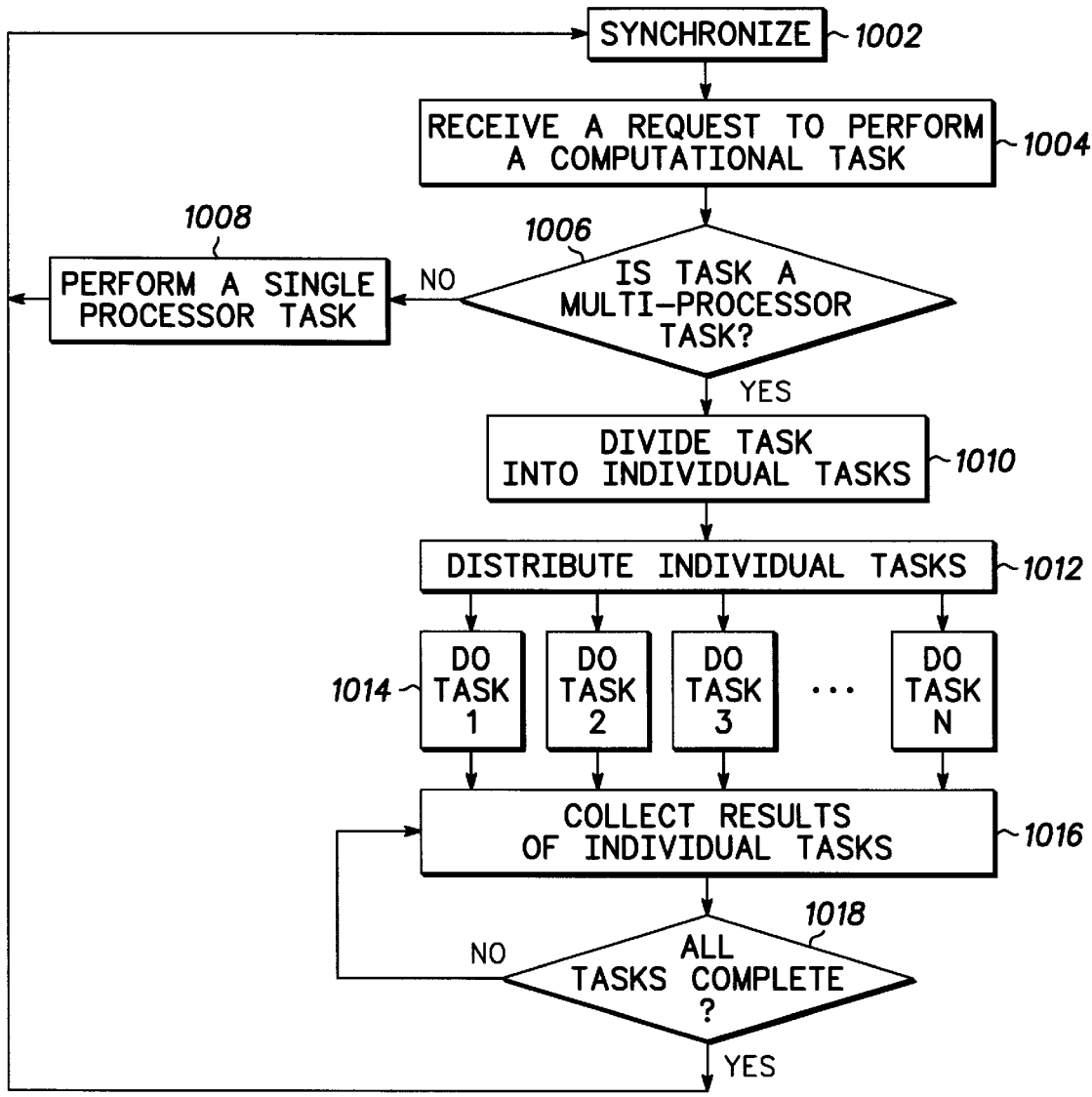
FIG. 10 shows a flow chart for a method for performing a computational task in accordance with a preferred embodiment of the present invention.

FIG. 10 shows a flow chart for a method for performing a computational task in accordance with a preferred embodiment of the present invention. For example, the flow chart can illustrate the steps performed in task 606 (FIG. 6). This flow chart illustrates the actions taken by the multi-processing operating system in order to execute a synchronized shared processing task. When the satellite processors are not performing a task, the operating system runs synchronization task 1002 which assures that the processors on the various satellites are properly synchronized. If a synchronization error is detected, corrective action is taken to bring the processors back in to synchronous operation.

In step 1004, the operating system receives a request to perform a computational task. In step 1006, a query is performed to determine if the computational task is suitable for multi-processor execution. In a preferred embodiment, only software functions designed as concurrent tasks may run in a multiple processing mode. In a preferred embodiment, which is implemented as an object-oriented software design, a concurrent function is one in which control resides concurrently in several independent objects. Each object is responsible for the execution of a separate task, and events are passed between the objects as one-way messages. Events indicate things such as intermediate process step completion or state changes within a particular object.

If the function is not a concurrent function, then step 1008 is performed in which the task is assigned to a single processor. Method 1000 continues with the operating system returning to synchronization step 1002. If the function is a concurrent function, then step 1010 is performed in which the operating system divides the computational task into concurrent tasks. For example, the concurrent tasks could be the set of independent objects mentioned above. In step 1012, the operating system distributes the individual tasks by assigning each of the concurrent tasks to a different satellite processor.

In step 1014, the concurrent tasks are performed. In a preferred embodiment, the separate tasks execute simultaneously and largely independently. In some concurrent functions, it may be necessary to complete part of one task and send the results to a second task as an event message before the second task can continue. These messages are sent as necessary over the intersatellite links. Intersatellite link queues are included to ensure that these event messages are not lost if the intersatellite links are heavily loaded when an event is completed. When a task completes, the satellite processor sends the final results to a storage area designated by the operating system when the function was initiated. If this task was completed on a different satellite processor than the one responsible for collecting the results, the results are sent over the intersatellite links. It is typical but not necessary for the results collection area to reside in the memory associated with the processor which initiated the function.

In step 1016, a processor collects the results of the individual tasks. In step 1018, the processor responsible for collecting the results, checks that all results have been received. If all the results have not been received, method 1000 branches to step 1016. If all the results have been received, then method 1000 branches to step 1002 in which control is returned to the operating system by returning to the synchronization task.

Those skilled in the art will note that other software structures besides object-oriented designs are suitable for multi-processing and that these structures could also operate in a multiple satellite design of this type.

In various embodiments, several types of processor elements could be used. For example, there could be general sequential processors, image processors, fast fourier transform (FFT) engines, general digital signal processors (DSPs), optical processors, and others. These different types of processor elements could function in parallel synchronized combinations within a satellite and between satellites. There could also be multiple parallel tasks which are split between groups of parallel processors of each type.

The number of processor elements that can be included in the synchronized payload processors is variable and is determined by operations performed by the primary processor. Desirably, only the number of additional processors needed to perform the task is included. The primary processor can perform operations to include processor elements or take processor elements out of service. For computational tasks requiring a multi-element processing system, two or more processor elements are used. The two or more processor elements can reside on a single satellite or on any number of satellites in any cluster.

The maximum number of available processor elements is determined by the configuration of the processing system and the configuration of the individual processor payload satellites. For example, there can be several different types of processor elements on-board any one processor payload satellite. These could, for example, be identified as high, medium, and low capability processors.

This identification could be used, for example, in a task management process to determine which processors perform which tasks. The task management process would solve problems by dividing the work that needs to be done into three categories: high complexity, medium complexity, and low complexity. The high complexity tasks would be assigned to the processors with high capability. The medium complexity tasks would be assigned to the processors with medium capability but could be assigned to the processors with high capability. The low complexity tasks would be assigned to the processors with low capability but could be assigned to the processors with high or medium capability.

The method and apparatus of the present invention provide a systems solution to achieving extremely high computer processing capacity on-orbit. In a preferred embodiment, a cluster of processor payload satellites at geosynchronous altitudes would be used which comprise two or more processor payload satellites in similar orbits with small variations which enable them to stay in a localized area around some fixed point. For example, one approach to this solution could be the placement of five processor payload satellites in a geosynchronous orbit that provides a ground trace resembling a figure eight. Each of the processor payload satellites would have some of the same orbital parameters (e.g., inclination or argument of perigee) but would have another slightly different orbital element (e.g., the mean anomaly at epoch). This cluster of processor payload satellites in a common orbit, with slight orbital element differences between each of them, would enable a combined mission with each processor payload satellite accomplishing portions of the total mission in a synchronous manner.

The advantage of the present invention is that the payload processing is interconnected and coordinated to form a multiprocessing computer subsystem. The various processors on the separate processor payload satellites work together to perform the necessary processing functions. Coordination is accomplished through communication between the clustered satellites. The communication may be via radio or optical crosslinks. Clustering of satellites to increase the payload processing through multiprocessing leads to more capability on orbit for systems control, mission operations, and communications.

An important feature of the method and apparatus of the present invention is that the system processing capability can be increased to meet the mission demands. In some missions, only modest processing capability is necessary early in the system life, but more processing power is necessary as demand for the mission services grows. Traditionally, this increasing demand can only be achieved by launching replacement satellites with more powerful computer subsystems. With the clustering approach, it is only necessary to launch and link-in less-expensive and lighter satellites. This allows improved production economies and avoids the danger that healthy, fully operational satellites will need to be replaced because of overload conditions.

The satellite cluster concept enables the computing capacity of a satellite system to be increased. By executing various processing segments of a total system task using processing elements on individual processor payload satellites, and networking the processor payload satellites through communication links, the system computational capability increases with the number of elements in the cluster. The complexity and speed of the space-based processors enable smaller satellites to be fitted into clusters to fulfill even the most computationally complex missions.

One use of the method and apparatus of the present invention is in the performance of a telecommunication satellite mission. Any number of other missions can be enhanced by clustering of processor payload satellites and their processors (e.g., fixed satellite services, communication services, mobile satellite systems, and direct broadcast systems).

The method and apparatus of the present invention enable the use of a single satellite orbital slot to be greatly enhanced through the use of a cluster of GEO processor payload satellites with coordinated payload processors instead of a single large satellite. Satellite clusters optimize the mission and cost of the system using the method and apparatus of the present invention.

The present invention has been described above with reference to a preferred embodiment. However, those skilled in the art will recognize that changes and modifications can be made in this embodiment without departing from the scope of the present invention. For example, while a preferred embodiment has been described in terms of using a specific number of processor payload satellites for configuring a system, other systems can be envisioned which use different numbers of processor payload satellites. Accordingly, these and other changes and modifications which are obvious to those skilled in the art are intended to be included within the scope of the present invention.

What is claimed is:

1. A satellite cluster comprising:
  a plurality of processor payload satellites, wherein said plurality of processor payload satellites contain payload processors each having at least one processor element, and said payload processors are interconnected and synchronized into a parallel processing system using at least one crosslink between said plurality of processor payload satellites, and a processor element of said at least one processor element acts as a primary processor in said parallel processing system and other processor elements act as secondary processors in said parallel processing system, and said primary processor controls and synchronizes said secondary processors, and at least one processor payload satellite of said plurality of processor payload satellites communicates with at least one ground device over a downlink between said at least one processor payload satellite and said at least one ground device.

2. The satellite cluster as claimed in claim 1, wherein said plurality of processor payload satellites are geosynchronous processor payload satellites.

3. The satellite cluster as claimed in claim 2, wherein said geosynchronous processor payload satellites are located within a common orbital slot.

4. The satellite cluster as claimed in claim 2, wherein said geosynchronous processor payload satellites are located close together.

5. The satellite cluster as claimed in claim 2, wherein said geosynchronous processor payload satellites are located in different orbits but in a substantially straight line with respect to a point on a surface of the earth.

6. The satellite cluster as claimed in claim 1, wherein said plurality of processor payload satellites are non-geosynchronous processor payload satellites.

7. The satellite cluster as claimed in claim 6, wherein said non-geosynchronous processor payload satellites are located substantially within a common orbit.

8. The satellite cluster as claimed in claim 6, wherein said non-geosynchronous processor payload satellites are located close together.

9. The satellite cluster as claimed in claim 6, wherein said non-geosynchronous processor payload satellites are located in different orbits but in a substantially straight line with respect to a point on a surface of the earth.

10. The satellite cluster as claimed in claim 1, wherein at least one of said plurality of processor payload satellites communicates with at least one other processor payload satellite in a different orbit over at least one additional crosslink.

11. A processor payload satellite for use in a satellite cluster, wherein said processor payload satellite comprises:
  an antenna unit used to receive uplink signals transmitted from transmitting sources to said processor payload satellite, wherein said uplink signals cause a first number of computational tasks to be performed by synchronized payload processors of said satellite cluster, and said antenna unit is also used to transmit downlink signals from said processor payload satellite to receiving sources, wherein said downlink signals provide information which results from said first number of computational tasks being performed by said synchronized payload processors;
  a transceiver coupled to said antenna unit, used to demodulate said uplink signals transmitted by said transmitting sources into uplink data and to convert downlink data into said downlink signals, wherein said uplink data is data which is used to perform said first number of computational tasks and said downlink data is data which results from a second number of computational tasks being performed;
  a crosslink transceiver for converting crosslink transmitted data into crosslink transmitted signals and for converting crosslink received signals into crosslink received data, wherein said crosslink transmitted data is data which is sent to another satellite in said satellite cluster and is used to cause at least one processor element in said another satellite to perform at least a portion of said first number of computational tasks, and said crosslink received data is data which is received from said another satellite and which results from said at least a portion of said first number of computational tasks being performed;

a crosslink antenna unit for transmitting said crosslink transmitted signals and receiving said crosslink received signals, wherein said crosslink antenna unit is coupled to said crosslink transceiver; and a payload processor coupled to said transceiver and said crosslink transceiver for processing said uplink data, processing said downlink data, processing said crosslink transmitted data, processing said crosslink received data, controlling performance of said first number of computational tasks, and performing at least one of said first number of computational tasks, wherein said payload processor includes a number of processor elements that can be controlled individually and can be included in said synchronized payload processors, wherein said controlling performance comprises determining if said first number of computational tasks must be performed by a multi-element processing system, causing said first number of computational tasks to be performed using said multi-element processing system when said determining step determines said first number of computational tasks must be performed by said multi-element processing system, and causing said first number of computational tasks to be performed using a single-element processing system when said determining step determines that said first number of computational tasks does not need to be performed by said multi-element processing system.

12. A processor payload satellite as claimed in claim 11 wherein said antenna unit further comprises:

a first antenna for transmitting first signals to and receiving second signals from a plurality of communication units; and a second antenna for transmitting third signals to and receiving fourth signals from a system control center.

13. In a satellite communication system which uses a satellite cluster to provide communication services, a communication unit, which has been adapted to operate with said satellite cluster, comprising:

a transmitter to provide at least one uplink communication channel to said satellite cluster, wherein said transmitter transmits command signals to said satellite cluster causing synchronized payload processors of said satellite cluster to perform computational tasks, said command signals being used to determine if said computational tasks must be performed by a multi-element processing system, to cause said computational tasks to be performed using said multi-element processing system when said determining step determines said computational tasks need to be performed by said multi-element processing system, and to cause said computational task to be performed using a single-element processing system when said determining step determines that said computational tasks do not need to be performed by said multi-element processing system;

a receiver to provide at least one downlink communication channel from said satellite cluster wherein said receiver receives data signals from said satellite cluster resulting from said computational tasks performed by said synchronized payload processors; and a processor coupled to said transmitter and said receiver for determining said command signals, for processing said data signals, and for controlling said transmitter, said receiver, and said communication unit.

14. In a satellite system which uses a satellite cluster, a method of operating a communication unit which has been adapted to operate with said satellite cluster, the method comprising the steps of:

transmitting uplink signals to a processor payload satellite in said satellite cluster, wherein said uplink signals contain command signals which cause synchronized payload processors in said satellite cluster to perform at least one computational task, said command signals being used to determine if said at least one computational task must be performed by a multi-element processing system, to cause said at least one computational task to be performed using said multi-element processing system when said determining step determines said at least one computational task needs to be performed by said multi-element processing system, and to cause said at least one computational task to be performed using a single-element processing system when said determining step determines that said at least one computational task does not need to be performed by said multi-element processing system;

receiving downlink signals from at least one processor payload satellite in said satellite cluster, wherein said downlink signals contain data signals from said satellite cluster which results from said at least one computational task being performed by said synchronized payload processors; and processing said uplink signals and said downlink signals.

15. A method of operating a satellite cluster comprising the steps of:

receiving, at a first satellite, a request to perform a computational task;

determining if said computational task must be performed by a multi-element processing system;

causing said computational task to be performed using said multi-element processing system comprising multiple synchronized processing elements if said determining step determines said computational task must be performed by said multi-element processing system; and causing said computational task to be performed using a single-element processing system comprising a single processing element if said determining step determines that said computational task does not need to be performed by said multi-element processing system.

16. The method as claimed in claim 15 wherein said step of causing said computational task to be performed using said single-element processing system further comprises the steps of:

selecting a processor payload satellite;

determining whether said computational task can be performed on said processor payload satellite;

causing said computational task to be performed when said computational task can be performed on said processor payload satellite;

determining whether another processor payload satellite is available, when said computational task cannot be performed on said processor payload satellite; and when said another processor payload satellite is available, performing said computational task on said another processor payload satellite.

17. The method as claimed in claim 16 wherein said step of causing said computational task to be performed using said single element processing system further comprises the steps of:

storing results from performing said computational task when said computational task is performed on said processor payload satellite.

18. The method as claimed in claim 15 wherein said step of causing said computational task to be performed using said multi-element processing system further comprises the steps of:

selecting first and second processor payload satellites;

determining whether said computational task can be performed on said first and second processor payload satellites;

causing said computational task to be performed when said computational task can be performed on said first and second processor payload satellites;

determining whether another processor payload satellite is available, when said computational task cannot be performed on said first and second processor payload satellites; and when said another processor payload satellite is available, using said another processor payload satellite to perform said computational task.

19. The method as claimed in claim 18 wherein said step of causing said computational task to be performed using said multi-element processing system further comprises the steps of:

storing results from performing said computational task when said computational task is performed on said first and second processor payload satellites.

20. The method as claimed in claim 15, wherein said step of causing said computational task to be performed using said multi-element processing system comprises the steps of:

dividing said computational task into individual tasks;

distributing said individual tasks to multiple satellite processors; and collecting results of said individual tasks from said satellite processors.

21. In a satellite communication system which uses a satellite cluster to provide communication services, a method of operating a system control center which has been adapted to operate with said satellite cluster, the method comprising the steps of:

transmitting command signals to a processor payload satellite in said satellite cluster, wherein said command signals cause synchronized payload processors in said satellite cluster to perform at least one computational task, said command signals being used to determine if said at least one computational task must be performed by a multi-element processing system, to cause said at least one computational task to be performed using said multi-element processing system when said determining step determines said at least one computational task must be performed by said multi-element processing system, and to cause said at least one computational task to be performed using a single-element processing system when said determining step determines that said at least one computational task does not need to be performed by said multi-element processing system;

receiving response signals from said processor payload satellite in said satellite cluster, wherein said response signals contain data signals from said satellite cluster which resulted from said at least one computational task being performed by said synchronized payload processors; and processing said command signals and said response signals to control operations being performed by said satellite cluster and to obtain data from said response signals.

* * * * *